May 30, 1939.  G. H. FEIGH  2,160,652
PISTON RING REMOVER
Filed Dec. 2, 1937
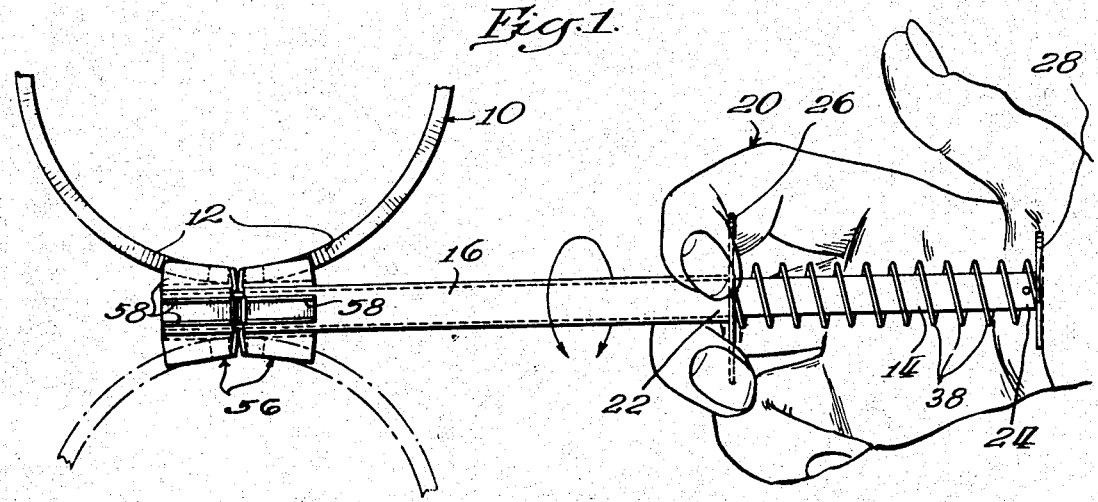
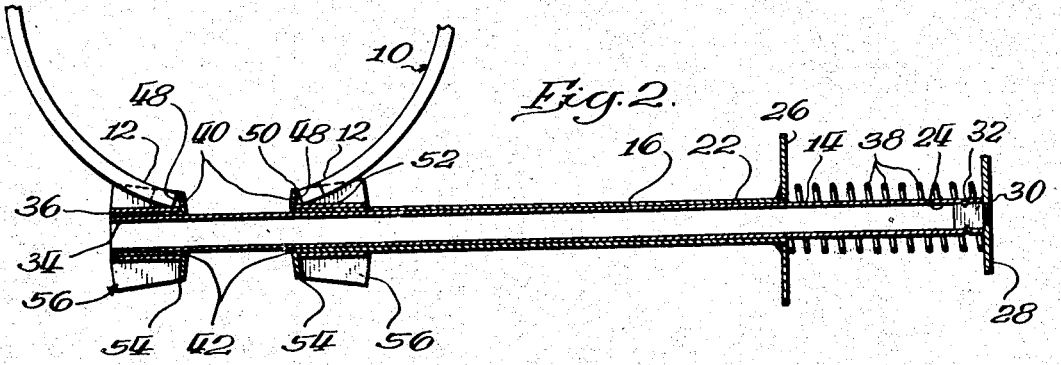
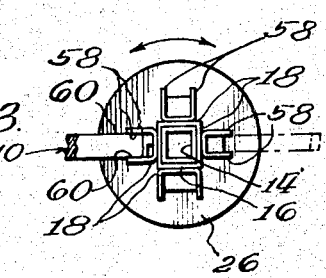
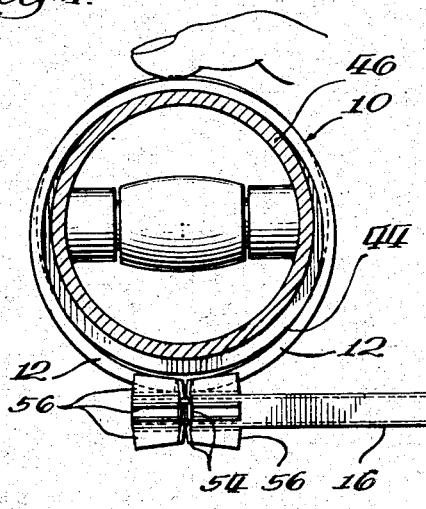
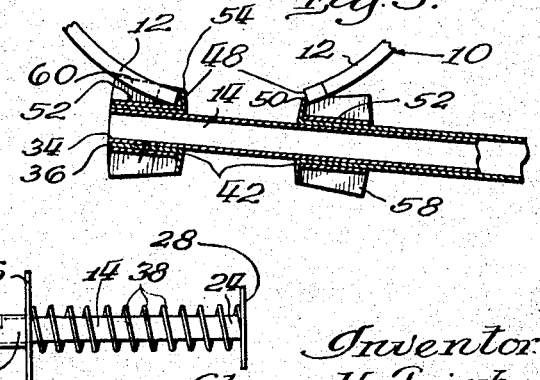
Inventor
Glenn H. Feigh
By Williams, Bradbury, McCaleb & Hinkle
Attys.

Patented May 30, 1939

2,160,652

UNITED STATES PATENT OFFICE 2,160,652

PISTON RING REMOVER

Glenn H. Feigh, Chicago, Ill., assignor to Walter W. Elliotson, Chicago, Ill.

Application December 2, 1937, Serial No. 177,714

6 Claims. (Cl. 29—86.4)

The invention relates to piston ring removers.

Difficulty has been experienced in removing and installing the piston rings of internal combustion engines. The rings have to be expanded to pass over the head of the piston when removed or installed and it is important that such expansion be enough to clear the face of the piston in order to prevent the face from being scored, yet no more than necessary since too much expansion may break the rings, or may spring the ring out of round. Moreover, it is highly important when expanding the rings to confine the spreading movement of each ring to the plane thereof so that the rings will not become distorted transversely in a way which would develop ring leaks and a radial binding between the closely fit faces of the ring and groove.

Due to the fact that piston rings have to be replaced from time to time and there are many different kinds of rings in use, which, although differing widely in many other respects, can be classified as to their relative thicknesses, and the great majority of these can be reduced to four classes as to thicknesses, one of the objects of the invention is to provide a single tool which may be used with equal facility to handle any one of a great number of rings falling within any one of four classes as to thicknesses.

Another object of the invention is to provide a piston ring expander engaging and confining to a single plane the movement of the split ends of any one of a number of piston rings having different thicknesses.

Another object of the invention is to provide an improved tool for spreading piston rings, which engages the split ends of a piston ring and holds the ring against slippage other than that created by an undue strain upon the ring.

Another object of the invention is to provide a speader for piston rings which engages all radially cut split-joint rings in approximately identical manner throughout a series of rings having different thicknesses.

Another object of the invention is to provide an improved piston ring tool which enlarges the diameter of a piston ring uniformly within the stress limits thereof and restricts the strain imposed thereon to the plane of the ring.

Another object of the invention is to provide a piston ring expander readily available to selective use with piston rings of different sizes, shapes and diameters.

Another object of the invention is to provide a device of the class described, which is simple in construction and operation, thoroughly effective in its use, and inexpensive to manufacture.

These being among the objects of the invention, other and further objects will become apparent from the drawing herein, the description relating thereto, and the appended claims.

Referring now to the drawing:

Fig. 1 is a top plan of a piston ring expander illustrating the preferred embodiment of the invention;

Fig. 2 is a sectional view of the embodiment illustrated in Fig. 1, wherein the expansion of the ring has been accomplished;

Fig. 3 is an end view of said embodiment;

Fig. 4 is a view similar to that shown in Fig. 1, illustrating how the embodiment is used to engage the split ends of a ring located upon a piston;

Fig. 5 is a view similar to that in Fig. 4, illustrating a safety factor for rings subjected to an unusual stress.

Referring now to the drawing in further detail, and particularly Figs. 1 and 2, the embodiment of the invention illustrated is shown as it is used with a conventional piston ring 10. The ring 10 is of the usual construction made of cast-iron or semi-steel and provided with a joint between two free ends 12 which are normally separated from each other a short distance under the customary expansion tension imposed upon the ring when it is manufactured.

The joint of the ring 10 may be a straight cut, a step cut, or a diagonal cut, but in any one of these instances, the cut runs transversely of the ring in a radial direction whereby the extremity of each end 12 is either a radial edge or a radial face, and the extremities of both ends form an angle at the center of the ring which increases as the ends 12 are spread.

The piston ring expander embodying the invention comprises two rectilinear telescoping parts 14 and 16 of different lengths, the inner one 14 being the longer of the two. The cross sectional contour of the parts is correspondingly polygonal to prevent relative rotation, and preferably square to provide four sides 18 for a purpose to be later discussed at greater length.

The two parts are reciprocated relative to each other, such as by hand 20, and to this end, are provided with suitable handles secured to corresponding ends 22 and 24 of the parts, a washer-like handle 26 being secured to part 16 as by welding or the like, and a disk-like handle 28 by a lug 30 and peened portion 32.

The opposite end 34 of the inner part 14 is provided with a short section 36 of tubular stock like the part 16, and this short section is welded on the part 14 with the part 16 traversable a substantial distance on the part 14 between the limits provided by the section 36 at one end and an expansion spring 38 disposed between the handles 26 and 28 at the other end, the spring 38 predisposing an abutting relationship between the part 16 and the section 36.

At their abutting ends the part 16 and section 36 are constructed reversely identical to each other by portions thereof being bent radially and appreciably reversely upon themselves at 42 to provide pairs of shoulders 40, a pair for each face 18, insertable between and engaging the ring ends 12 of the ring 10, whereby gripping pressure of the hand 20 on the handles 26 and 28 will expand the ring 10 to enlarge its diameter for sliding the ring over the wall 44 of a piston such as that indicated by the numeral 46 in Fig. 4.

The heights of the several pairs of shoulders 40 are closely approximate to the different radial dimensions of the four major divisions of the conventional rings, and their widths correspond to the correlative thicknesses of the rings.

The reverse bending of the shoulders 40 is such that the faces 48 thereof which contact the ends 12 of the ring are inclined appreciably with respect to each other at an angle tapering away from the ring 10 so that the radial contours of the ends 12 of the ring are contacted at approximately their inner edges, with the end of the ring supported between the edge 50 of the shoulder 40 and the face 52 of the member from which the shoulder is formed.

Referring to Fig. 5, it will be seen how this construction engages and holds the end of the ring 10 up to a predetermined point when the ends 12 of the rings are cocked radially to a stress danger point where the face 48 of the part 36 operates to free the end 12 over the edge 54 of the shoulder 40 before the stress danger point of the ring is reached.

Moreover, as the ring is expanded more and more, the incline of the faces 48 tends to hold the ends 12 with increasing effectiveness, against the increasing tendency of the ring to spring away from the shoulders 40 spreading it. As the radial dimension of the end of the ring cross-section foreshortens relative to the shoulder 40 under increasing expansion, the inner edge of the ring is permitted to creep down the face 48 of the shoulder 40 away from the edge 54. In this way, the expander assures the distribution of the expansion strains evenly throughout the length of the ring, from end to end. In addition to this, the invention secures the rings against sudden releases dangerous to mechanics and other nearby workmen.

Reversely identical pairs of channel members 56 are secured with their included sides against the several faces 18 of the section 36 and part 16. The widths of the four different pairs of channels differ according to the four commonly encountered thicknesses of conventional piston rings. The channel portions are disposed with their longitudinal contours parallel with the axis of the telescoping members and their adjacent ends are closed by the shoulders 40. The sides 58 of each pair of channel members engage the sides 60 of a ring having corresponding dimensions to prevent a transverse springing of the rings when expanded by the shoulders 40. Moreover, the sides 58 gradually increase in height in a manner somewhat following the circular contour of the ring on each side of the shoulders 40. This provides a more perfect securement of the ring against transverse springing so that dangers arising out of a careless handling of the tool are minimized. Rings of different sizes can also be handled with equal facility.

When installing rings upon a piston, the shoulders 40 of that pair of channel members which corresponds in width to the thickness of the piston is inserted between the ends 12 thereof at the cut. The grip on the handles 26 and 28 is tightened slightly to maintain the engagement between the ring ends 12 and the shoulders 40. Then the ring 10 is brought to a position above the piston 46 and expanded additionally just enough to clear, without scraping, the face 44 of the piston. The ring is lowered to the groove intended and the opposite side of the ring pressed into the groove (see Fig. 4), whereupon the separator is relieved of the grip and the ends permitted to close to their normal position.

In removing the ring, the reverse of the above takes place, in which the opposite side of the ring is pressed as shown in Fig. 4 to expose fully the ends of the ring, the shoulders 40 inserted therebetween, and the ring spread sufficiently to be removed over the face of the piston.

Thus it will be observed that with the invention a large variety of piston rings can be installed with equal and identical facility, with no danger of the effects of localized strains and stresses, and little, if any, danger to workmen. Moreover, the successful installation of rings may be done assuredly well within the tolerances permitted for the expansion of rings in the process.

In this way, the invention not only provides structural features advantageous in the handling of any particular ring, but also provides a single tool for use with any one of a number of different rings since it is made ready for such use with any one of a number of different rings by merely rotating the forearm of the hand holding the tool. Moreover, the tool may be used for a single ring upon either side of the piston without need for the laborious and time-consuming operation of turning the ring around in its groove to a single point convenient for the operator. A mere half rotation of the forearm brings the same channel member in place on either side of the piston, and the construction of the handles is such that the tool may be gripped in any one of a universal number of ways.

Consequently, although a preferred embodiment of the invention has been shown and described herein, it will be apparent to those skilled in the art that various and further uses, modifications and changes may be made without departing from the spirit and substance of the invention, the scope of which is commensurate with the appended claims.

What is claimed is:

1. A piston ring expander, comprising an elongated member having a polygonal cross-sectional contour, a polygonal member of similar contour secured thereto at one end thereof, channel members secured to said polygonal member, each to a side thereof and having parallel sides aligned longitudinally therewith, portions of said polygonal member being bent appreciably back upon themselves to a position covering the end of each of said channel members intermediate the ends of said elongated member, a second polygonal member reciprocably mounted on said elongated member having a construction reversely identical to said first polygonal member, resilient means normally holding said polygonal members in abutting relationship, and means for separating said polygonal members at will.

2. A piston ring expander, comprising an elongated member, an element secured thereto at one end thereof, channel members secured to said element around its perimeter and having parallel sides aligned longitudinally therewith, portions of said element being bent to a position covering the end of each of said channel members intermediate the ends of said elongated member, a second member reciprocably mounted on said elongated member against relative rotation and having a construction reversely identical to said first member, channel members secured to said second member in reverse symmetry to said first mentioned channel members, resilient means normally holding said element and said second members in abutting relationship, and means for separating same at will.

3. A piston ring expander comprising an elongated member having a square cross-sectional contour, an element secured to said elongated member at one end thereof, channel members secured to said element around the perimeter thereof and having parallel sides aligned longitudinally therewith, portions of said element being bent to a position covering the end of each of said channel members intermediate the ends of said elongated member, a second polygonal member reciprocably mounted on said elongated member having secured thereto channel members and bent portions reversely identical to those of said element, resilient means normally holding said element and second polygonal member in abutting relationship, and means for separating same at will.

4. A piston ring expander comprising an elongated member having a polygonal cross-sectional contour, a polygonal member of similar contour secured thereto at one end thereof, channel members secured to said polygonal member, each to a side thereof and having parallel sides aligned longitudinally therewith, portions of said polygonal member being bent to a position covering the end of each of said channel members intermediate the ends of said elongated member, a second polygonal member reciprocably mounted on said elongated member having a construction reversely identical to said first polygonal member, resilient means normally holding said polygonal members in abutting relationship, and means for separating said polygonal members at will.

5. A spreader for piston rings comprising two normally abutting members reciprocable relative to each other along a rectilinear axis and held against relative rotation, a plurality of peripherally spaced channel members having different widths secured to said members in reversely identical pairs both members of each of said pairs being aligned parallel to the longitudinal axis of the device, means integral with said abutting members closing adjacent ends of each of said pairs of channel members for engaging the ends of cut piston rings and holding said rings in a predetermined relation, and manual means for reciprocating said abutting members.

6. A spreader for piston rings comprising two normally abutting members reciprocable relative to each other along a rectilinear axis and held against relative rotation, a plurality of peripherally spaced channel members secured to said members in reversely identical pairs and having different widths to accommodate rings of differing axial thicknesses, both members of each of said pairs being aligned parallel to the longitudinal axis of the device, means closing adjacent ends of each of said pairs of channel members for engaging the ends of cut piston rings and holding said rings in a predetermined relation, and manual means for reciprocating said abutting members.

GLENN H. FEIGH.